(12) United States Patent
Rogers et al.

(10) Patent No.: US 7,038,720 B2
(45) Date of Patent: May 2, 2006

(54) PIXEL-BY-PIXEL DIGITAL CONTROL OF GAIN AND OFFSET CORRECTION FOR VIDEO IMAGING

(75) Inventors: Charles Andrew Rogers, San Jose, CA (US); Richard Leigh Gower, San Jose, CA (US); Bhupendra Kumar Ahuja, Fremont, CA (US)

(73) Assignee: Exar Corporation, Fremont, CA (US)

( * ) Notice: Subject to any disclaimer, the term of this patent is extended or adjusted under 35 U.S.C. 154(b) by 701 days.

(21) Appl. No.: 10/273,407

(22) Filed: Oct. 16, 2002

(65) Prior Publication Data

US 2004/0075748 A1    Apr. 22, 2004

(51) Int. Cl.
    *H04N 5/217*    (2006.01)
(52) U.S. Cl. .................. 348/241; 348/243; 348/229.1; 348/255
(58) Field of Classification Search ................ 348/243, 348/241, 222.1, 229.1, 242, 255, 230.1; 399/78; 341/155, 141, 159
    See application file for complete search history.

(56) References Cited

U.S. PATENT DOCUMENTS

| 5,499,112 | A | * | 3/1996 | Kawai et al. ................ 358/475 |
| 5,808,295 | A | * | 9/1998 | Takeda et al. ............... 250/216 |
| 6,166,766 | A | * | 12/2000 | Moore et al. ................ 348/241 |
| 6,174,649 | B1 | * | 1/2001 | Park et al. ................... 430/321 |
| 6,252,536 | B1 | | 6/2001 | Johnson et al. |
| 6,299,329 | B1 | * | 10/2001 | Mui et al. .................... 362/227 |
| 6,342,919 | B1 | * | 1/2002 | Opris ........................... 348/241 |
| 6,346,968 | B1 | * | 2/2002 | Domer et al. ............. 348/223.1 |
| 6,357,904 | B1 | * | 3/2002 | Kawashima ................ 362/555 |
| 6,747,697 | B1 | * | 6/2004 | Lin et al. .................... 348/246 |
| 6,753,913 | B1 | * | 6/2004 | Bilhan et al. ............... 348/241 |
| 6,774,941 | B1 | * | 8/2004 | Boisvert et al. ............ 348/241 |

OTHER PUBLICATIONS

Buckley, Kevin. "Selecting an Analog Front-End for Imaging Applications"; Analog Dialogue, www.analog.com, vol. 34 No. 06, Oct. 2000.*

"XRD98L61, CCD Image Digitizers with CDS, PGA and 12-Bit A/D," product data sheet, Exar Corporation 48720 Kato Road Fremont, CA 94538 (2001).

"XRD98L63, CCD Image Digitizers with CDS, PGA and 12-Bit A/D," product data sheet, Exar Corporation 48720 Kato Road Fremont, CA 94538 (2002).

* cited by examiner

*Primary Examiner*—Ngoc-Yen Vu
*Assistant Examiner*—Gregory V. Madden
(74) *Attorney, Agent, or Firm*—Townsend and Townsend and Crew LLP

(57) ABSTRACT

A method and apparatus for adjusting, on a pixel-by-pixel basis, the gain and offset in an AFE as the pixels are sequentially processed. Although the method can be used for any purpose, it is directed in particular to light source non-linearity, such as edge effects of a scanner. A unique clocking method clocks the gain and offset values into the register at a higher clock rate than the image sampling rate.

10 Claims, 9 Drawing Sheets

PIXEL-BY-PIXEL DIGITAL CONTROL OF GAIN AND OFFSET CORRECTION FOR VIDEO IMAGING

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention relates to analog to digital conversion circuits used in imaging, and more specifically to programmable gain and offset for different colors in the Analog Front End (AFE) of a color digital camera, scanner or other imager.

This invention in particular is directed to the analog to digital converter subsystem part of an imaging system which includes a light source, a light focusing element, an image detector, an analog to digital converter, a controller chip, and memory. This invention interacts with the controller chip and memory in the imaging system to reduce the errors of the overall system caused by the light source, light focusing element and image detector.

It is common for the lighting and the focusing system within an imaging system to have non-ideal, non-linear characteristics. U.S. Pat. Nos. 6,174,649, 5,499,112, 5,808,295, 6,299,329, 6,357,904 show different methods for improving the light source linearity. The U.S. Pat. No. 5,499,112 best summarizes these non-idealities in its review of prior art in FIGS. 1–16.

In scanning applications, the linear tube light, which scans the document, has non-uniform light intensity near its two ends as opposed to its mid section. Also, the lensing system, which focuses the image onto a CCD linear array, has distortions near the two ends of a linear lighting system. Finally, at initial power ON of scanner lighting system and also over time through aging, the light intensity over the image has a non-uniform and time dependent nature.

In a typical imaging system, an Analog Front End (AFE) circuit is used with a CCD, CMOS or other image sensor. The AFE will provide initial amplification and calibration of the signal before it is digitized. In particular, a Correlated Double Sampler (CDS) samples the analog signal, and also samples a reset value and a black level (with no light). A Programmable Gain Amplifier (PGA) amplifies each pixel value before it is provided to an Analog-to-Digital Converter (ADC). Different color values are typically provided by using different color filters in front of the pixel of the image sensor.

Different color values require amplification by different amounts because the image sensors have different responses for different colors. In addition, sometimes multiple green pixels are used because the human eye is more sensitive to green. The use of multiple pixel values allows enhancement.

The particular color value presented at a pixel in a line can be programmed as well. A color filter array pattern is defined by programming pixel repeat registers and line pattern registers. The line pattern can be a different pattern of repeating colors, such as the Bayer pattern or the CYMG (cyan, magenta, yellow, green) pattern. In addition to putting the pattern in the line pattern register, the pixel repeat register is used to indicate how many pixels are used for each pattern before the pattern repeats.

Once the color filter array pattern has been defined, the intensity detected for each pixel can be associated with a particular color, and the gain can be programmed accordingly. In an example circuit, the National Semiconductor LM98501, multiple registers are provided to allow the programming of different gain values for different colors. A typical situation where this occurs is where the camera detects different light levels. At different levels of light, the required amplification of the image sensor signal can vary. A combination of all the colors is used to produce white. At different levels of brightness of the ambient light, the amplifications of each color must be varied so that they will combine to produce white. This is typically done automatically in a digital camera, which has a processor which detects the light level and changes the amplification registers for the different colors accordingly.

A typical approach to offset and gain is to use a single value for all the pixels in a line or image, or a single value for each of multiple colors for the entire line or image. For example, Exar CCD image digitizer XRD9861 uses such a fixed gain over the whole line. Another method involves changing the offset and gain in a predictable repeating pattern. This is intended to adjust for color offsets, not fringe effects. An example is shown in Exar's CCD image digitizer XRD9863. Another method used in some prior art devices is to use an analog input, rather than a digital input for the offset in gain.

In another pending application of the same assignee, a master gain register is used, with different values being used for each of the other colors. Thus, when the ambient light level changes, only the master gain register needs to be changed. This is used for adjusting video in digital cameras, for example. The application is entitled "Programmable Pixel Gain Control with Master Gain", Ser. No. 09/680,800 filed Oct. 4, 2000.

BRIEF SUMMARY OF THE INVENTION

The present invention provides a method and apparatus for adjusting, on a pixel-by-pixel basis, the gain and offset in an AFE as the pixels are sequentially processed. Although the method can be used for any purpose, it is directed in particular to light source non-linearity, such as edge effects of a scanner. A unique clocking method clocks the gain and offset values into the register at a higher clock rate than the image sampling rate.

At initial power ON of a scanner lighting system, and also over time thru aging, the light intensity over the image has a non-uniform and time dependent nature. The present invention allows a controller, using Digital Signal Processing (DSP) techniques, to determine offset and gain values to correct for this for each pixel. The controller then feeds the values from memory, on the fly, to the Analog Front End (AFE) chip which has pixel by pixel gain/offset correction built in. Alternately, this could all be done on one chip.

In one embodiment, a pipeline of three registers for each offset and gain value is provided to accommodate the need to sequentially clock in multiple gain and offset values, and then subsequently provide them in parallel to multiple color paths. A series of input registers are used to load the initial values, and when loaded, are clocked in parallel to provide their values to intermediate holding registers. The contents of the holding registers are clocked out in parallel during the second sampling so that they are available for the entire third sampling to be used to control the offset and gain.

In another embodiment, the present invention uses a switched capacitor programmable gain amplifier, with a split capacitor structure. This structure uses two banks of capacitors, with a serial capacitor connecting the two banks, allowing the serial, connecting capacitor to appropriately scale (weight) one of the banks, avoiding the need to provide a wider range of capacitor sizes for different ordinal positions in a multi-bit value. The invention uniquely applies this arrangement to a virtual ground input of an operational amplifier, allowing a unit value capacitor to be used for the serial connecting capacitor, rather than an odd value as in prior art uses of such a split capacitor amplifier in other applications.

For a further understanding of the nature and advantages of the invention, reference should be made to the following description taken in conjunction with the accompanying drawings.

DETAILED DESCRIPTION OF THE INVENTION

Figure 1:
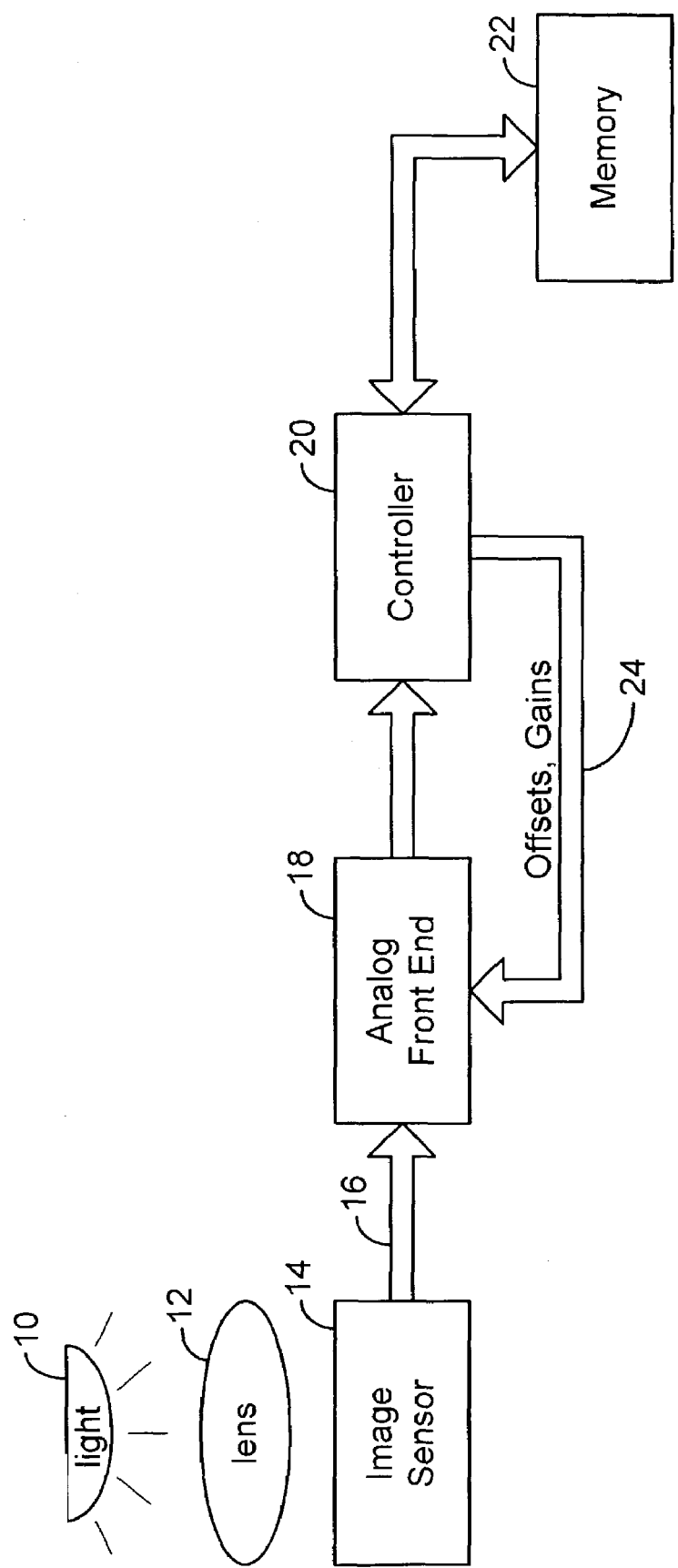
FIG. 1 is a block diagram of an embodiment of an image sensor system incorporating the present invention.

The description below is for embodiments of the invention using three color values. Other embodiments could be used with different colors or number of colors, or using gray scale, or other variations. FIG. 1 is a block diagram of the system in which the present invention may be incorporated. A light source 10 can be a fluorescent tube, Light Emitting Diodes (LEDs) or other light source of the scanner, or simply the ambient light for a still or video camera. Lens 12 focuses the light on an image sensor 14, which could be, for example, a Charged Coupled Device (CCD) sensor or a Complementary Metal Oxide Silicon (CMOS) sensor. Typically, for each pixel position, the photo detectors will be provided for multiple color values, such as providing red, green and blue values for each pixel position. These are provided serially over interface 16 to analog front end (AFE) 18. Analog front end 18 provides offsets and gains and digitizes the values, then provides them to a controller 20.

In the present invention, controller 20, through analyzing the values received using DSP methods, can determine that different offsets or gains are needed at the ends of an image or at other places to deal with non-linearities or other effects of the light, lens or image sensor detectors, etc. The values of the offset and gain for each pixel, and for each color of that pixel, can be stored in a memory 22. During processing, these values are provided from memory 22 along a bus 24 to an input port of AFE 18. In one embodiment, AFE 18 is a separate semiconductor chip from controller 20. In an alternate embodiment, either the controller or memory 22 could be provided in the same chip as the AFE. The same issues of accessing the memory and providing the data for real time processing arise in either embodiment.

Figure 2:
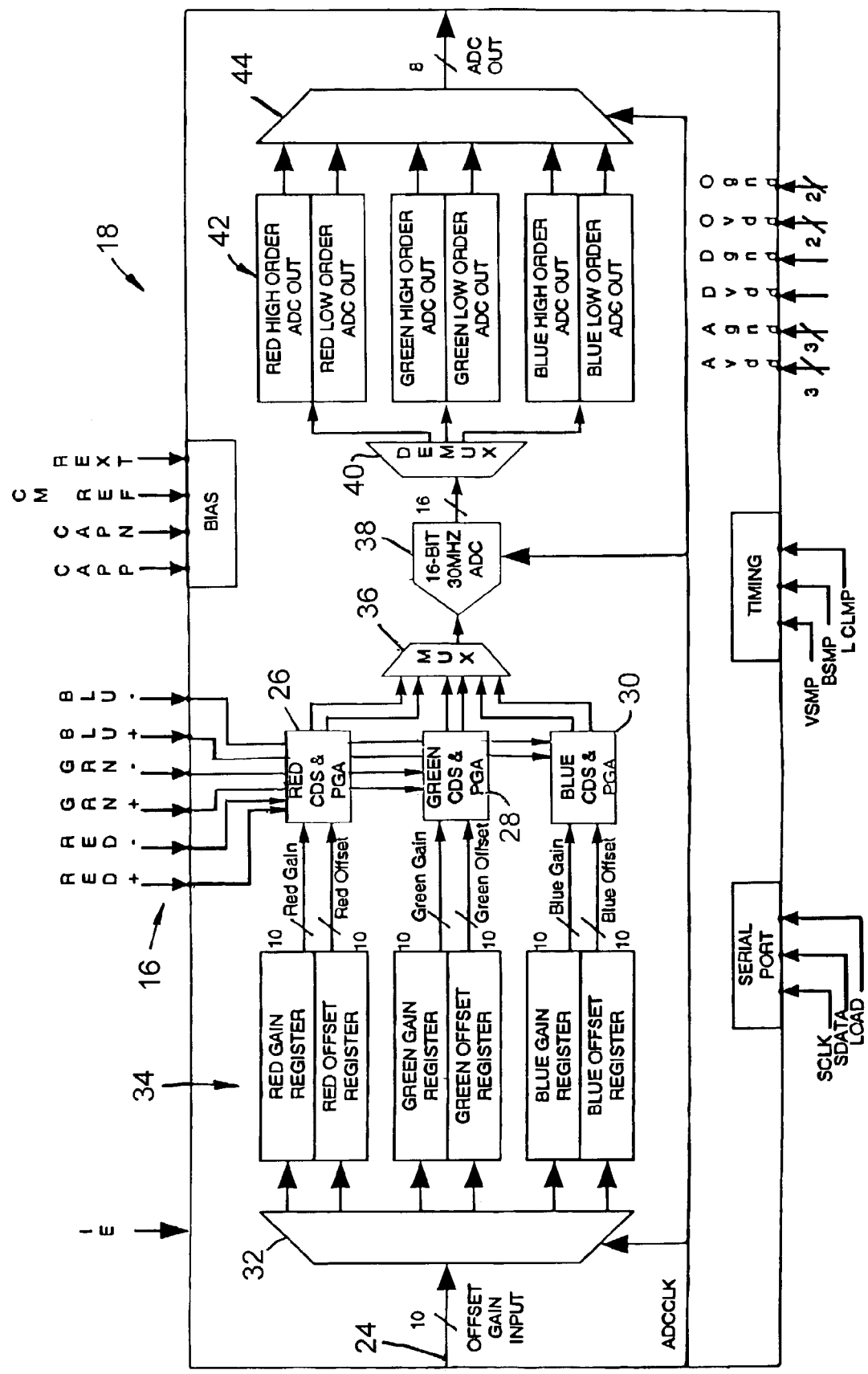
FIG. 2 is a block diagram of an embodiment of the analog front end (AFE) of FIG. 1.

FIG. 2 is a block diagram of AFE 18 of FIG. 1. The inputs on lines 16 from the image sensor are provided to red, green and blue CDS & PGA circuits 26, 28 and 30 respectively. The offset and gain values are provided on input bus 24, and demultiplexed with demultiplexer 32 to be provided to the gain and offset registers 34.

The rest of the AFE circuit, not impacted by the present invention, consists of multiplexer 36, ADC 38, demultiplexer 40, output registers 42 and output multiplexer 44.

Figure 3:
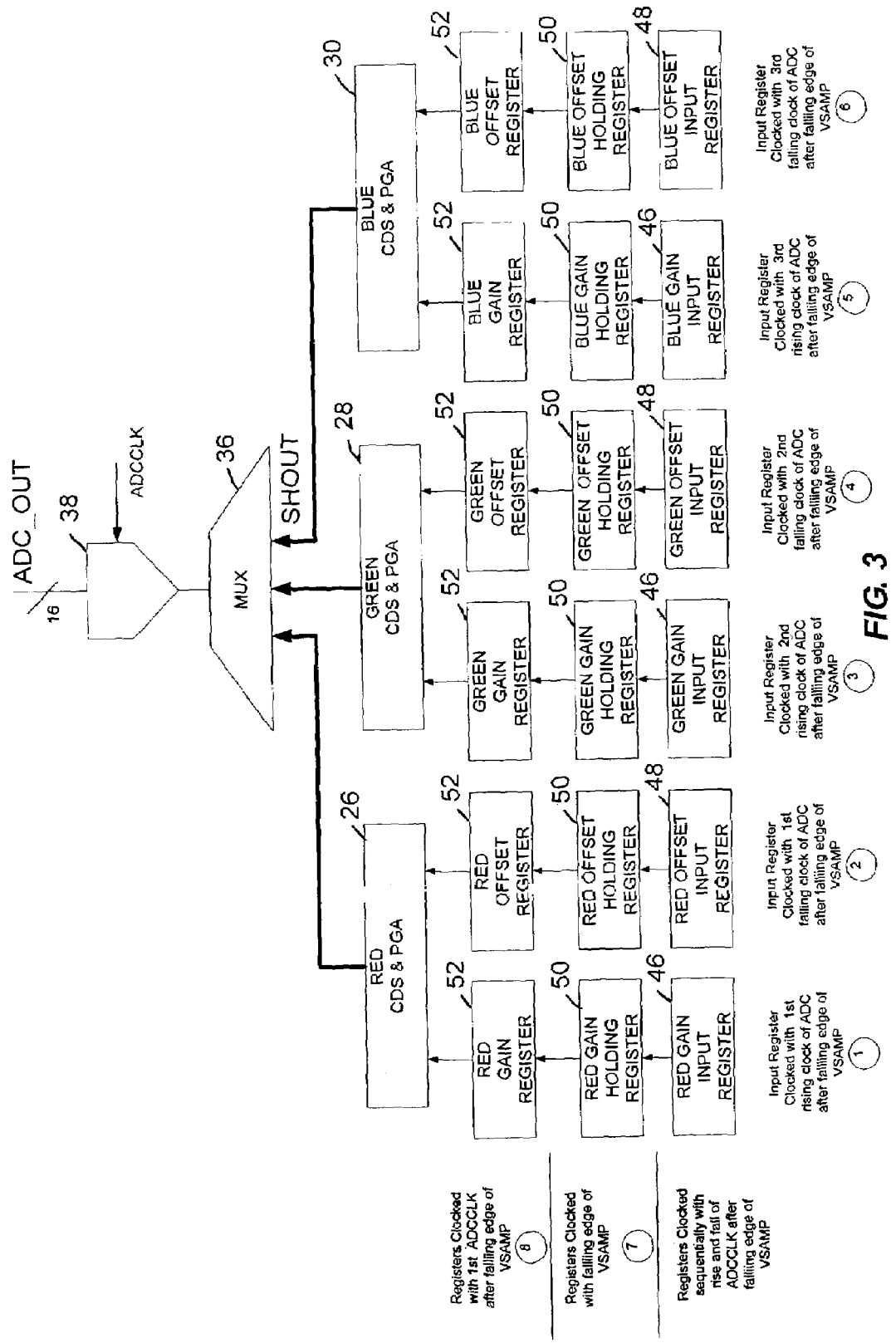
FIG. 3 is a diagram illustrating the pipeline registers of the present invention in an embodiment with a separate CDS and PGA for each color.

FIG. 3 illustrates the gain and offset registers 34 in more detail. As can be seen, there are three gain input registers 46, one each for red, green and blue. There are also three offset input registers 48 for red, green and blue. The outputs of registers 46 and 48 are provided to a series of holding registers 50. The contents of holding registers 50 are then provided to final gain and offset registers 52.

Circled numbers 1–6 illustrate the clock edges used to clock data into each of the input registers. These correspond to the circled numbers on the ADCLK of the timing diagram of FIG. 4.

The inventors recognize that the input registers could not be used to themselves apply their values to the CDS and EGA circuits because it will take an entire sample period to load them. Also, they must all be present in parallel for their use with the three parallel CDS and PGA circuits 26, 28 and 30. After they are loaded into the input registers 46 and 48, they are subsequently clocked into the holding registers 50 at the beginning of the next sampling period (circled number 7 in FIG. 4). The holding registers themselves cannot be used to directly apply the values to the CDS & PGA precisely because the input registers must be loaded into the holding registers to make room for the next set of inputs in the next sampling. This would overwrite the register values precisely at the time they are being applied to the CDS and PGA. Accordingly, the holding registers are used as an intermediate register, with the data being clocked in and out in the same sampling period. This allows the final registers 52 to hold the values for the full sampling time.

Figure 4:
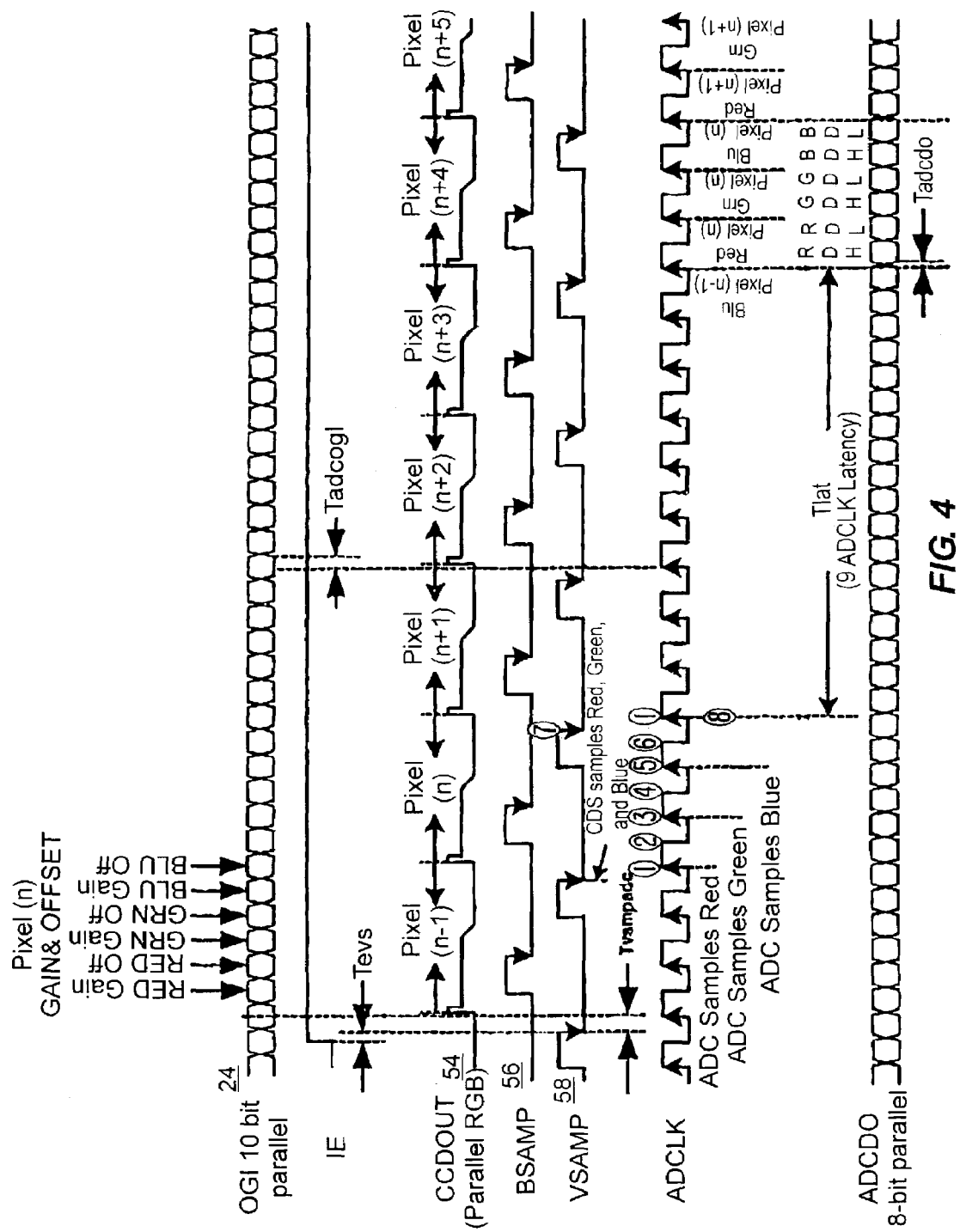
FIG. 4 is a timing diagram illustrating the loading and progression through the pipeline registers of FIG. 3.

It is illustrated in FIG. 4, after the six values are first loaded into the input registers, at times 1–6. The falling edge of the signal VSAMP, at time 7, then loads the values from the input registers into the holding registers 50. The next ADCLK rising edge (8) immediately clocks the data out of the holding registers into the final gain and offset registers 52. At the same time, this edge also starts the sequence of loading into the input registers again for the next pixel value. Since the VSAMP signal (the Video Sampling signal) needs to have the register values present for application to the PGA, it simply will not work to have the register being loaded on the falling edge when the values are needed. Thus, the holding register acts as a buffer, with the VSAMP using the digital value in the final register up to that falling edge. After that falling edge, at the next ADCLK edge 8, the new data is loaded into the final registers 52 to be ready for the next VSAMP pulse.

Other signals shown in FIG. 4 include the Offset/Gain Input (OGI) on line 24, and the IE signal which is the Input Enable for the offset and gain data input. The output of the image sensor, CCDOUT (signal 54), is the pixel values themselves, with the black voltage and pixel voltage being shown for each pixel value. The Black Sample signal (BSAMP) 56 and the video sample signal (VSAMP) 58 control switches in FIG. 5 as discussed below. The analog to digital converter clock (ADCLK) is provided at three times the sample rate, and the analog to digital converter data output (ADCDO) provides the final output signal.

Figure 5:
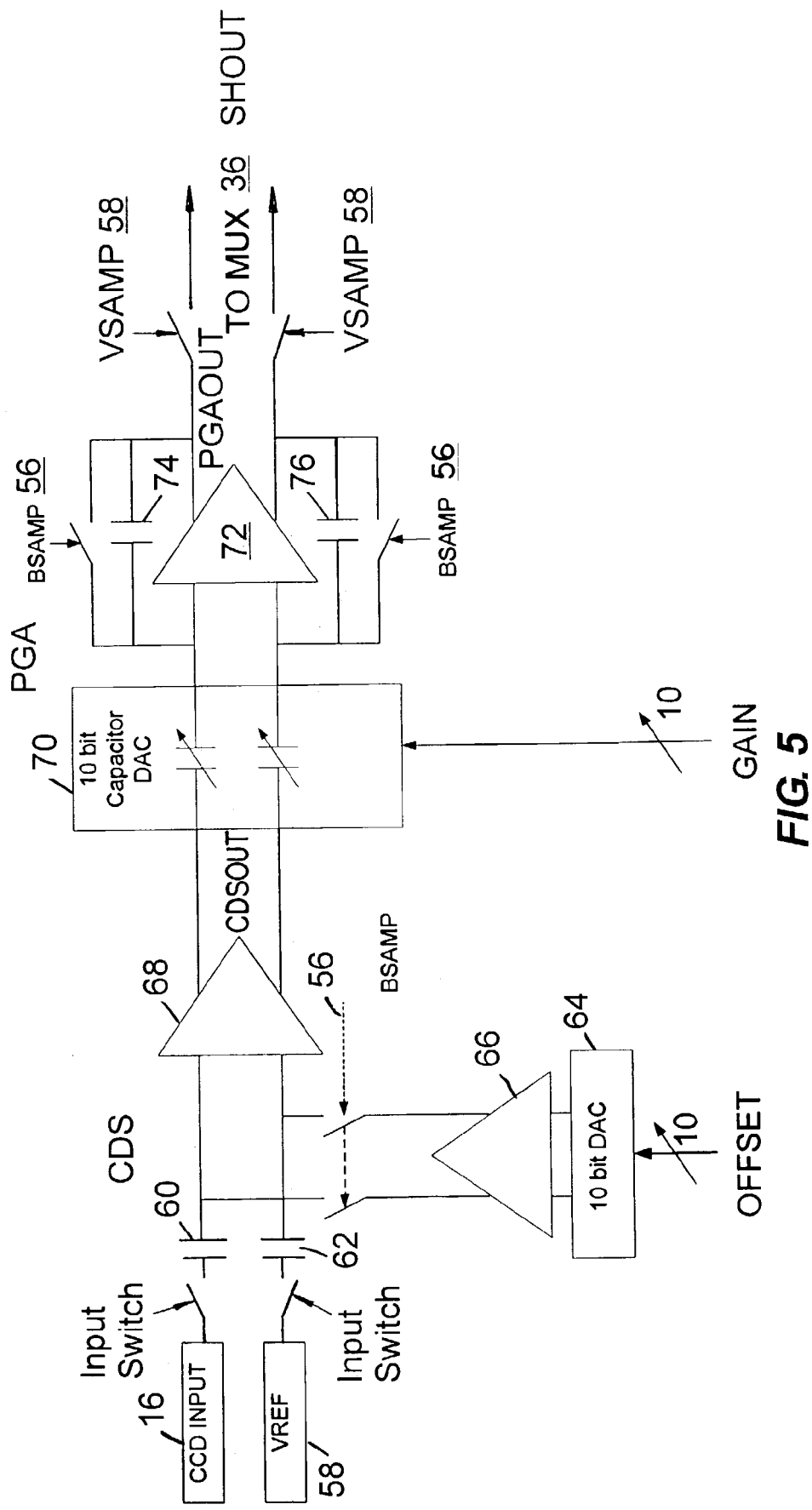
FIG. 5 is a diagram of an embodiment of the CDS and PGA of the AFE of the present invention.

Turning to FIG. 5, a block diagram of any of the CDS & PGA blocks 26, 28 and 30 of FIG. 3 is shown. A CCD input 16 and voltage reference 58 are provided through input switches to capacitors 60 and 62 of the correlated double sampler (CDS). The offset voltage is placed on these capacitors during the BSAMP signal 56 using the offset value provided through a 10 bit DAC 64 and buffer amplifier 66. The output of the CDS is provided through buffer amplifier 68 to the PGA.

The PGA is built using a 10 bit split, switched capacitor DAC 70 connected with feedback to an operational amplifier 72. (Details shown in FIG. 9 below). The switching signal BSAMP 56 serves to short the feedback capacitors 74 and 76 to reset the amplifier between pulses. Finally, BSAMP 58 controls the output switches of the PGA to provide the sample and hold output (SHOUT).

Figure 6:
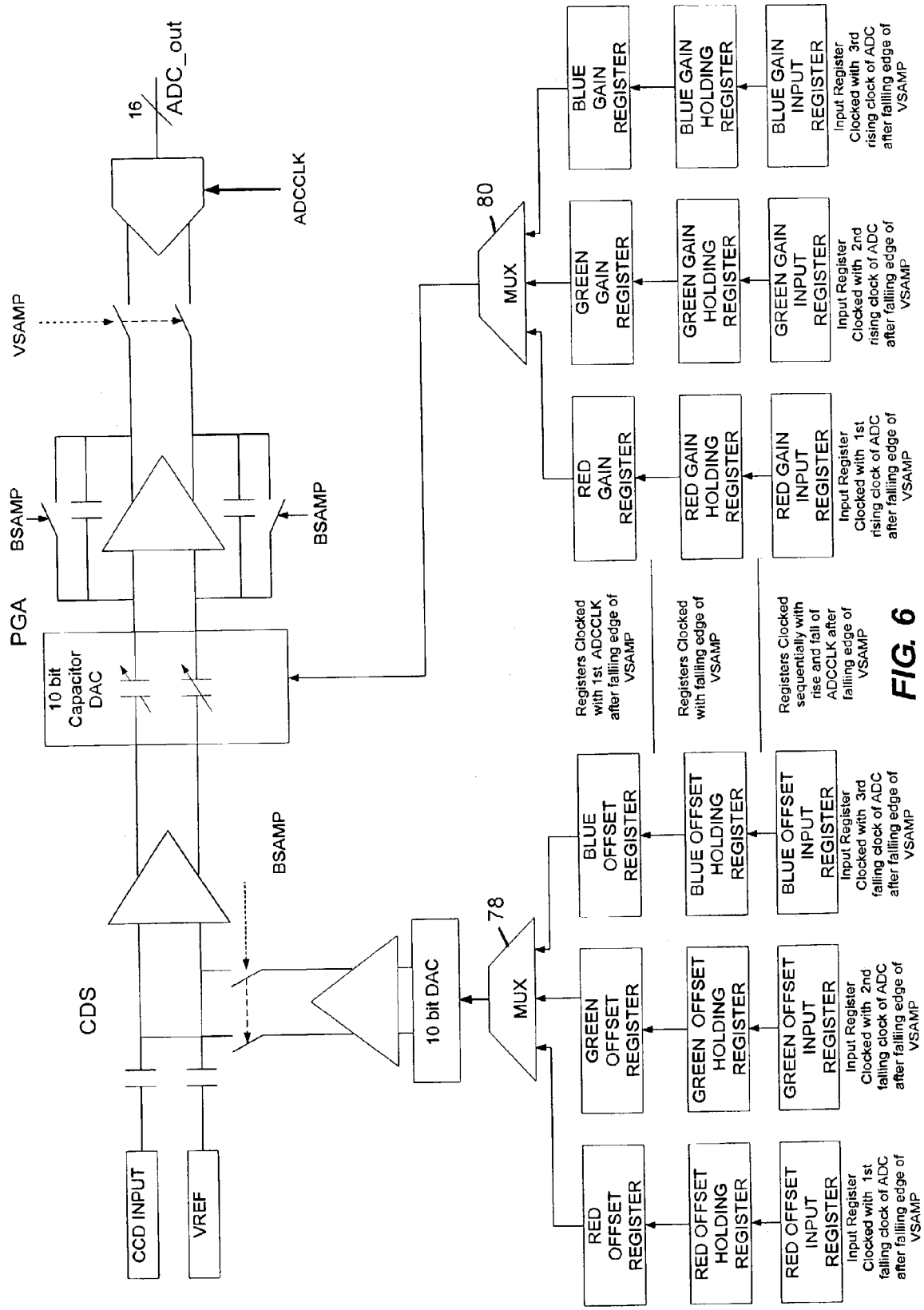
FIG. 6 is a block diagram of an AFE according to the invention illustrating how the registers of FIG. 3 are applied to the AFE in an embodiment using a shared CDS and PGA for different colors.

FIG. 6 illustrates an alternate embodiment where in a single CDS & PGA are used, with the red, green and blue offset and gain values being multiplexed through multiplexers 78 and 80. Otherwise, the circuitry of the CDS & PGA is the same as that shown in FIG. 5. The clocking of data into and through the input holding and gain and offset registers is the same as shown in FIG. 3.

Figure 7:
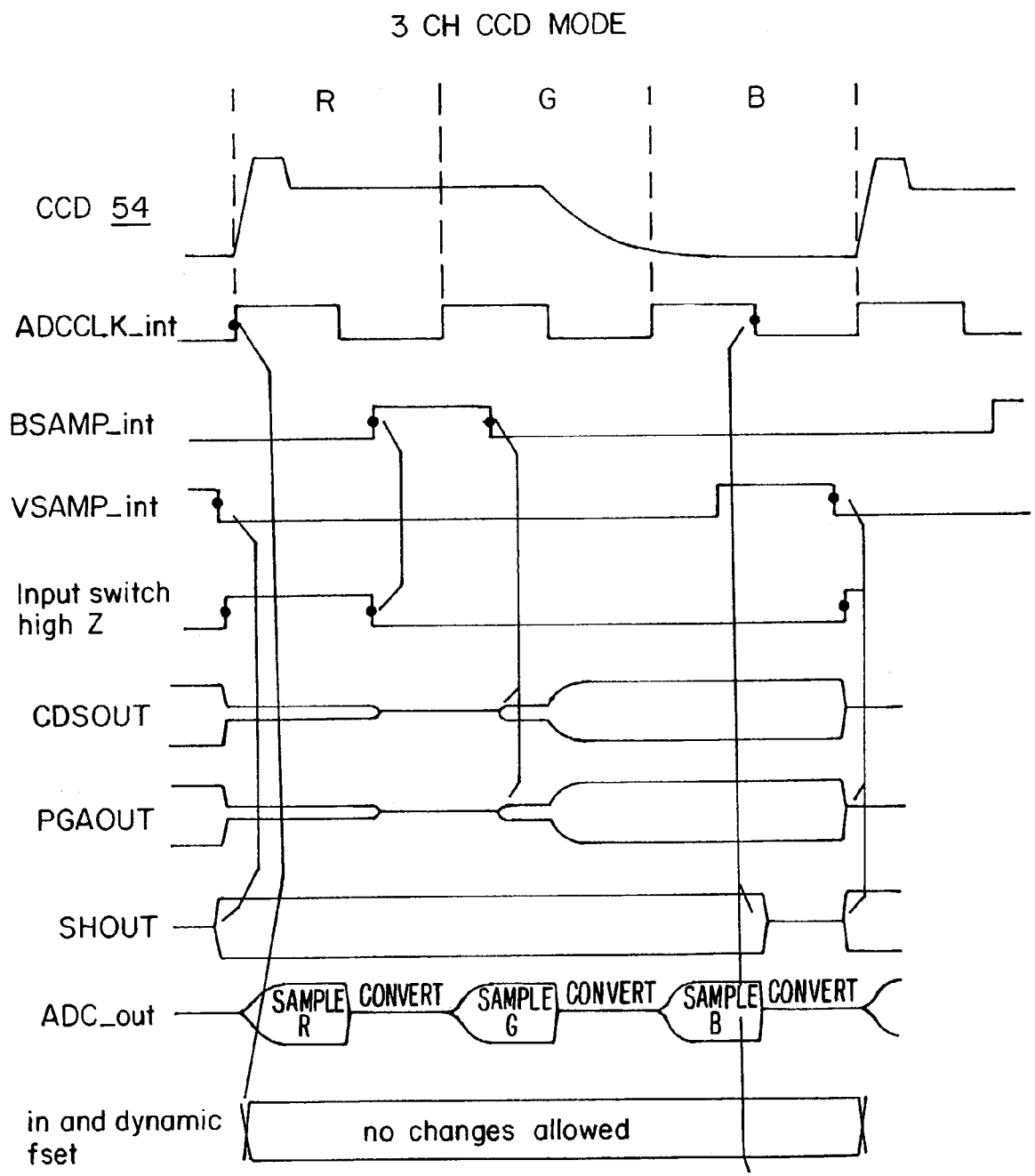
FIG. 7 is a timing diagram illustrating the timing signals applied to the circuit of FIG. 6 for a three channel mode (FIG. 3).
Figure 8:
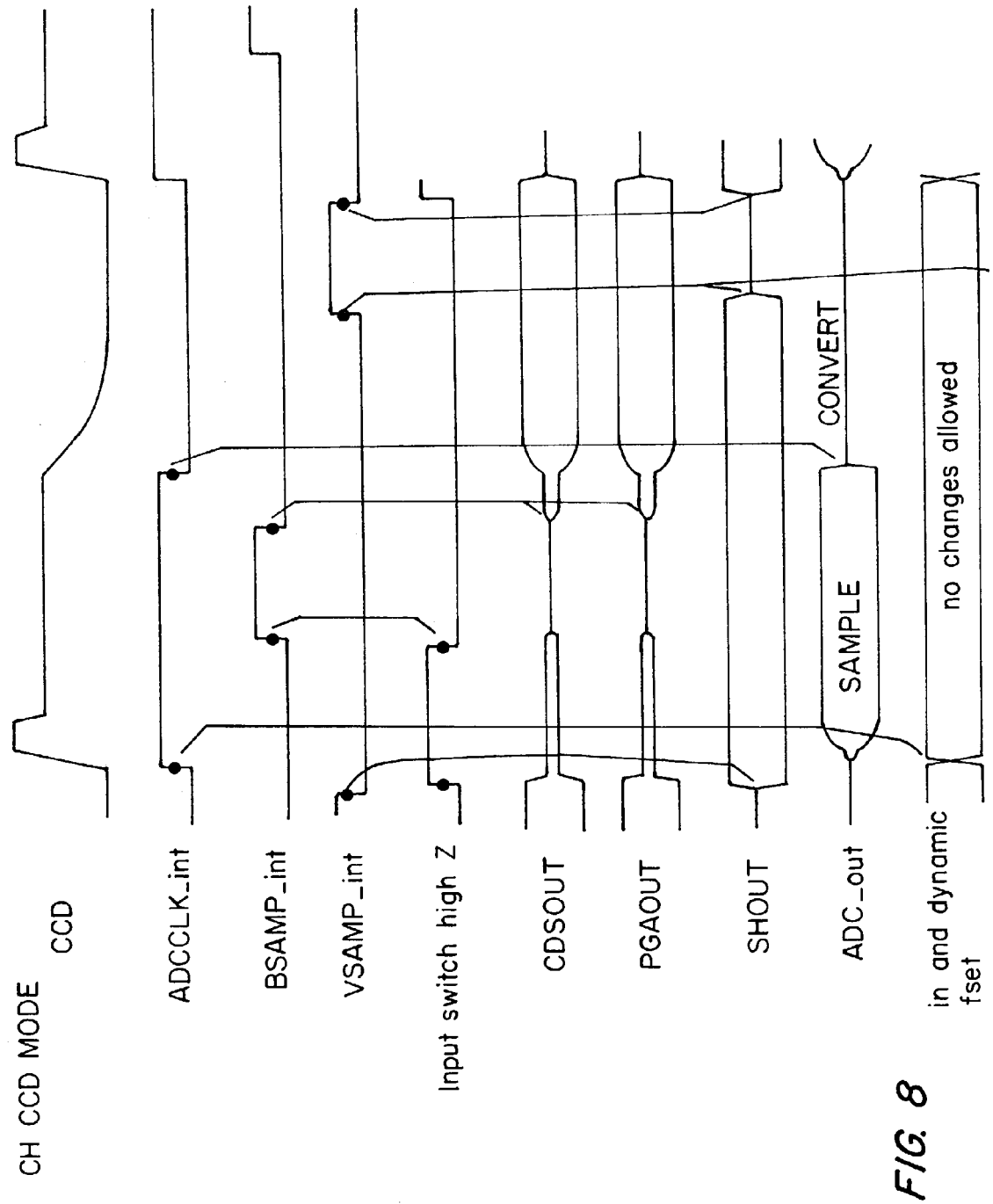
FIG. 8 is a timing diagram illustrating the timing signals for the circuit of FIG. 6 for a single channel mode (FIG. 6).

FIGS. 7 and 8 illustrate the timing for the CDS & PGA blocks, with FIG. 7 showing it for the three channel CCD mode where three colors are multiplexed on to a single CDS & PGA as shown in FIG. 6. FIG. 8 corresponds to the timing where there is a separate single channel for each CCD color, as shown in FIG. 3. The signal labels correspond to those shown in FIGS. 4 and 5.

Figure 9:
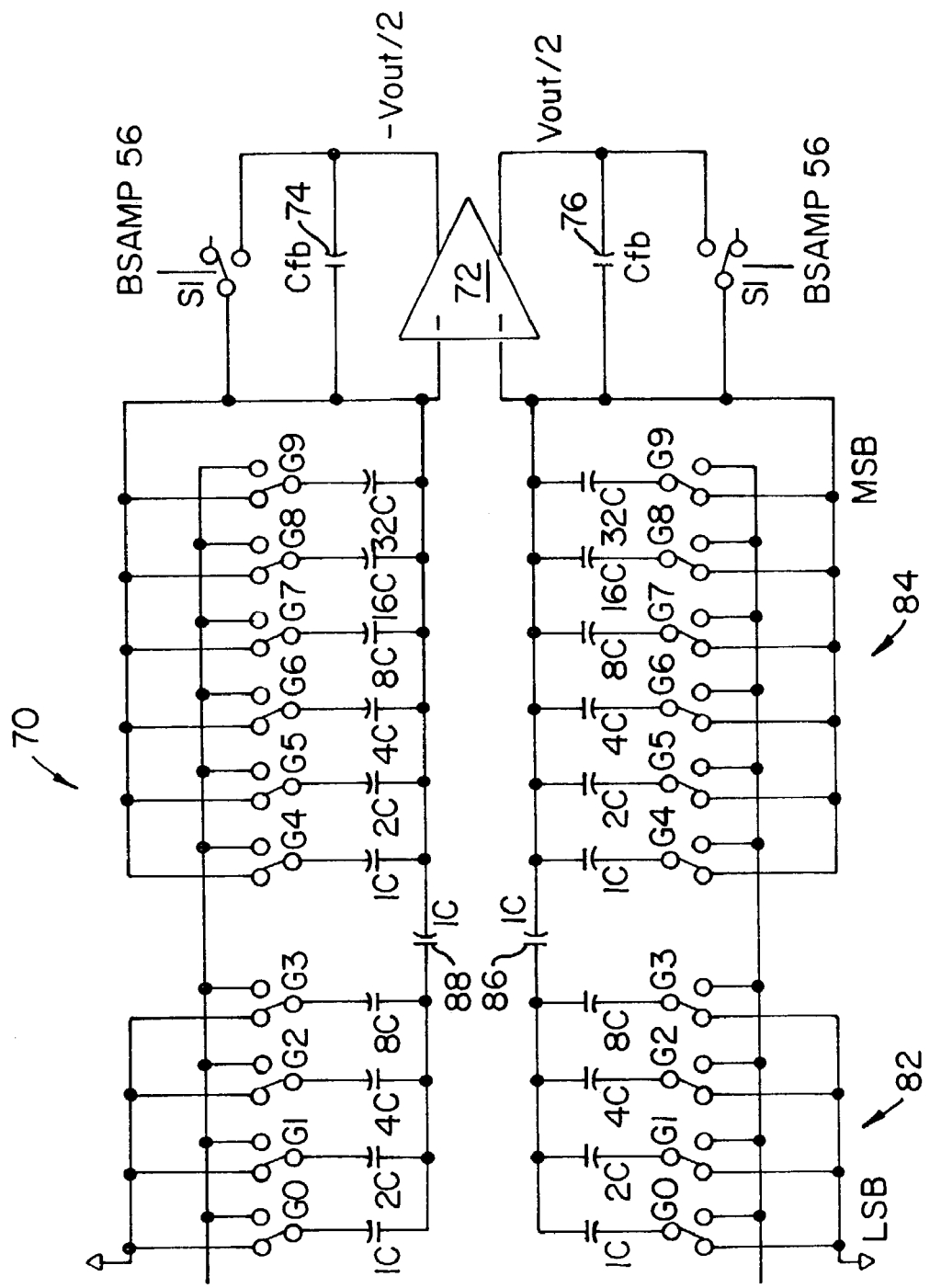
FIG. 9 is a circuit diagram of an embodiment of a split capacitor PGA according to the present invention.

FIG. 9 illustrates one embodiment of a PGA according to the invention, showing 10 bit capacitor DAC 70 and operational amplifier 72 of FIG. 5. The 10 bit gain inputs control the switches G0–G9, which connect weighted capacitors to the virtual ground inputs of operational amplifier 72. The capacitors are divided into two banks, a least significant bit (LSB) bank 82 and a most significant bit (MSB) bank 84. Two sets of capacitors and switches are provided for the two differential inputs. These are joined together by series capacitors 86 and 88. This split capacitor design, splitting the capacitors into two banks, avoids the need to have 10 capacitors with a range of sizes corresponding to the 10 ordinal positions in a multi-bit value. Rather, the four capacitors in bank 82 can have the same size as the first four capacitors in bank 84, but are scaled down as a group by the series capacitance 86 and 88. By uniquely connecting this split capacitor arrangement to the virtual ground input of an operational amplifier, rather than a comparator as in some prior art ADC uses of split capacitor architecture or into a high impedance input of a unity gain buffer for a DAC, the series capacitor can be a unit value which is easily manufactured, rather than an odd, non-unit value (e.g., 1.000 rather than 1.013) as in the prior art.

The gain amplifier is based on a differential switched capacitor type design. It has been modified to allow the gain to be changed within 1 clock cycle independent of the previous setting.

During phase one (BSAMP high), S1 is closed, auto-zeroing the amplifier output as the input signal is zero (black level). The input switches G9–G0 are closed dependent on the gain register stored code. During phase 2 (BSAMP low), S1 opens and the input signal changes, causing current to flow in the capacitors connected to the input to the virtual ground of the amplifier. This current is then converted to the output voltage by the feedback capacitor Cfb connected around the amplifier.

The gain is determined by the ratio of Cin to Cfb, where Cin is determined by the binary weighted capacitors connected to the gain control switches G9 to G0. Since the input of the amplifier is a virtual ground with the feedback capacitor connected, the gain of the MSB section is directly determined by which capacitors are connected to the input. For example, if G9 and G8 are closed, the gain would be 32C/Cfb+16C/Cfb.

The LSB section works similarly but because there is a unit capacitor connected to the virtual ground only $\frac{1}{16}$ of the current for each unit capacitor connected to the input will be directed to the virtual ground and therefore to the output. For example, if G1 and G2 are closed the gain would be (2C+4C)/(16*Cfb).

For this type of sub-ranging capacitive DAC, the matching of the gain is determined by the accuracy of the capacitor ratios. Because all the capacitors are based on a multiple of a unit capacitor, the gain can be made very accurately.

As will be understood by those with skill in the art, the present invention may be embodied in other specific forms without departing from the essential characteristics thereof. For example, instead of the gain and offset values being provided by an external controller, onboard memory could be used. The invention could be applied to not only CCD but also CMOS sensors. The invention could be applied to non-color systems using a gray scale, or to systems using more than three colors or different colors. The registers could have a number of bits other than 10, such as 8, 9, 11 or 12. Accordingly, the foregoing description is intended to be illustrative, but not limiting, of the scope of the invention which is set forth in the following claims.

What is claimed is:

1. An image digitizer comprising:
   (a) an image input;
   (b) an analog front end comprising
      (1) a correlated double sampler (CDS) coupled to said image input;
      (2) a programmable gain amplifier (PGA) coupled to an output of said correlated double sampler;
      (3) a multi-bit digital to analog converter coupled to an offset input of said CDS;
      (4) a multi-bit digital gain bus coupled to a gain input of said PGA;
   (c) a multi-bit gain/offset bus for providing multiple multi-bit gain and offset values in series;
   (d) a gain register and an offset register connected in parallel to said multi-bit gain/offset bus; and (e) a clocking circuit configured to clock data into said gain and offset registers at a higher clock rate than the clocking of image data through said image input.

2. The image digitizer of claim 1 wherein said offset input of said CDS is connected to an input stage of said CDS.

3. The image digitizer of claim 1 wherein said PGA is a switched capacitor, split digital to analog converter amplifier having:
   two banks of capacitors;
   a serial capacitor connecting said two banks of capacitors; and
   an operational amplifier having a virtual ground input connected to said two banks of capacitors, wherein said multi-bit digital gain bus connects to switches which determine which of said capacitors in said banks of capacitors are connected to said virtual ground input.

4. The image digitizer of claim 1 wherein said multi-bit is 10 bits.

5. The image digitizer of claim 1 wherein:
   said gain and offset registers comprise, for each of said gain and offset values, a pipeline of three registers including an input register, a holding register and a final register; and
   wherein said clocking circuit is configured to
   serially clock said multiple multi-bit gain and offset values into said input registers during a first sampling period;
   clocking the contents of all of said input registers, in parallel, into said holding registers during a first part of a second sampling period;
   clocking the contents of all of said holding registers, in parallel, into said final registers during a second part of said second sampling period;
   such that the contents of said final registers are available to said offset inputs of said CDS and said gain inputs of said PGA during a third sampling period.

6. The image digitizer of claim 1 further comprising:
   a processor configured to determine which pixels in an image sensor are defective, and to provide said gain and offset values to compensate for said defective pixels.

7. The image digitizer of claim 1 further comprising:
   a processor configured to determine lighting and lens nonlinearities, and to provide said gain and offset values to compensate for said nonlinearities.

8. The image digitizer of claim 1 further comprising multiple analog front ends, gain and offset registers for multiple colors.

9. An image digitizer comprising:
   (a) an image input;
   (b) a plurality of analog front ends for each of a plurality of colors, each analog front end comprising
      (1) a correlated double sampler (CDS) coupled to said image input;
      (2) a programmable gain amplifier (PGA) coupled to an output of said correlated double sampler;
      (3) a multi-bit digital to analog converter coupled to an offset input of said CDS;
      (4) a multi-bit digital gain bus coupled to a gain input of said PGA;
   (c) a multi-bit gain/offset bus for providing multiple multi-bit gain and offset values in series;
   (d) a gain register and an offset register, for each of said colors, connected in parallel to said multi-bit gain/offset bus, said gain and offset registers comprising, for each of said gain and offset values, a pipeline of three registers including an input register, a holding register and a final register; and
   (e) a clocking circuit configured to clock data into said gain and offset registers at a higher clock rate than the clocking of image data through said image input, wherein said clocking circuit is configured to
   serially clock said multiple multi-bit gain and offset values into said input registers during a first sampling period;
   clocking the contents of all of said input registers, in parallel, into said holding registers during a first part of a second sampling period;
   clocking the contents of all of said holding registers, in parallel, into said final registers during a second part of said second sampling period;
   such that the contents of said final registers are available to said offset inputs of said CDS and said gain inputs of said PGA during a third sampling period.

10. An image digitizer comprising:
    (a) an image input;
    (b) an analog front end comprising
       (1) a correlated double sampler (CDS) coupled to said image input;
       (2) a programmable gain amplifier (PGA) coupled to an output of said correlated double sampler;
       (3) a multi-bit digital to analog converter coupled to an offset input of said CDS;
       (4) a multi-bit digital gain bus coupled to a gain input of said PGA;
    (c) a multi-bit gain/offset bus for providing multiple multi-bit gain and offset values in series;
    (d) a gain register and an offset register connected in parallel to said multi-bit gain/offset bus; and
    (e) a clocking circuit configured to clock data into said gain and offset registers at a higher clock rate than the clocking of image data through said image input;
    (f) wherein said PGA is a switched capacitor, split digital to analog converter amplifier having:
       two banks of capacitors;
       a serial capacitor connecting said two banks of capacitors; and
       an operational amplifier having a virtual ground input connected to said two banks of capacitors, wherein said multi-bit digital gain bus connects to switches which determine which of said capacitors in said banks of capacitors are connected to said virtual ground input.

* * * * *